Jan. 7, 1969          C. J. KOESTER          3,421,096
LASER LIGHT-AMPLIFYING STRUCTURES AND THE LIKE
Filed Aug. 3, 1966
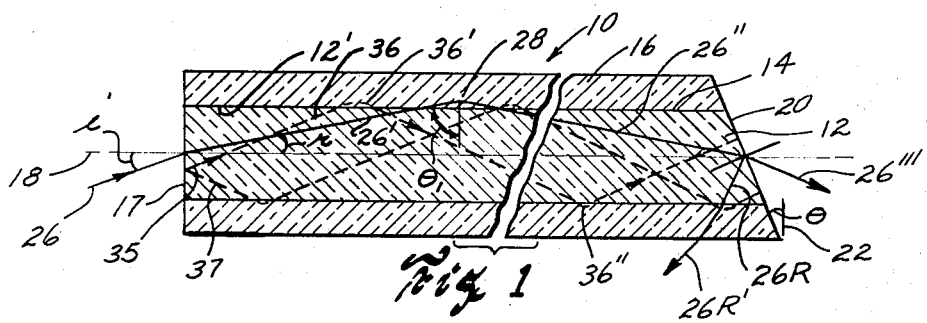
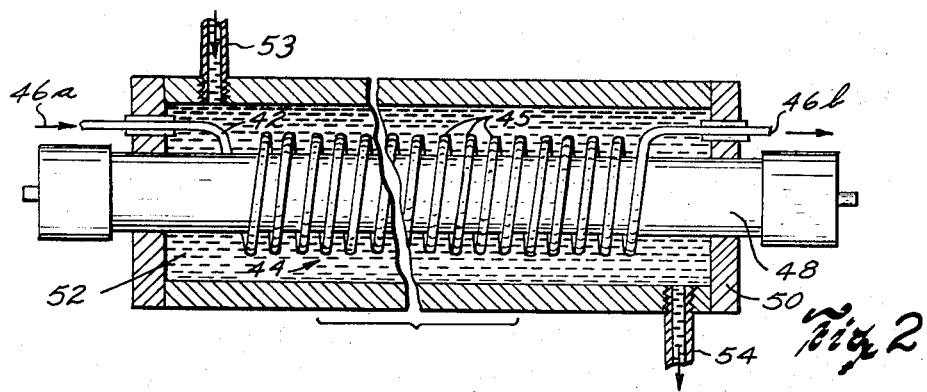
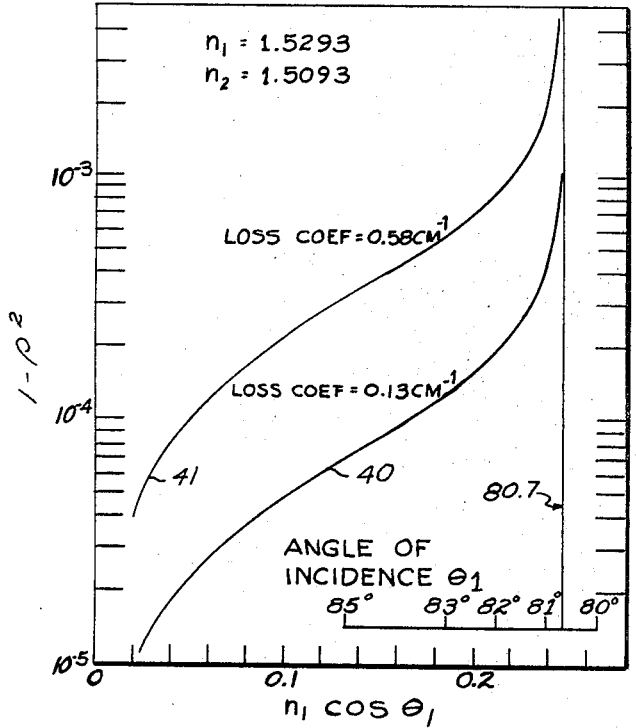
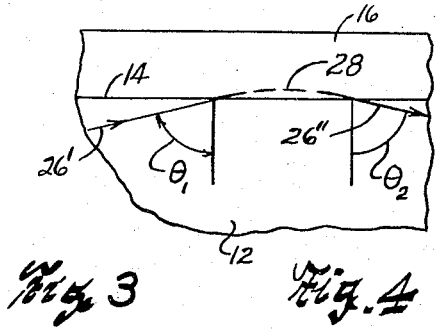
INVENTOR.
CHARLES J. KOESTER
BY
ATTORNEY United States Patent Office 3,421,096
Patented Jan. 7, 1969

3,421,096
LASER LIGHT-AMPLIFYING STRUCTURES
AND THE LIKE
Charles J. Koester, South Woodstock, Conn., assignor, by mesne assignments, to American Optical Company, Southbridge, Mass., a corporation of Delaware
Filed Aug. 3, 1966, Ser. No. 570,016
U.S. Cl. 330—4.3
Int. Cl. H01s 3/00
3 Claims

ABSTRACT OF THE DISCLOSURE

Thin elongated fiber laser amplifier component comprising a core of transparent laser material of predetermined refractive index and absorbing cladding of relatively lower index in surrounding relation thereto, said component having its opposite ends so angularly disposed relative to a cross-section through said component adjacent thereto and relative to the refractive indices of core and cladding as to effect a resonant laser cavity structure between said end surfaces for optical energy travelling at large angles of deviation within said core and relative to axis of component while simultaneously providing amplification for optical signal at laser emission wavelengths entering and travelling through said component at lesser angles of deviation.

---

This invention relates to improvements in laser light-amplifying structures, components, and the like and more particularly to improvements in thin elongated fiber optical laser structures, and the like, for providing light amplification of predetermined amounts for optical signals being transmitted through said components from end-to-end thereof.

The word "light," as used above as well as hereinafter in the specification which follows, is intended to be taken in its generic sense indicating not only optical energy within the visible region of the electromagnetic spectrum but within the infra-red and ultra-violet regions as well.

Laser light-amplifying devices in the form of thin, elongated fiber-like structures are already known. Such earlier structures, each generally comprised a central fiber core formed of a light-transmitting laser material of a predetermined refractive index value surrounded throughout its length by a cladding of transparent material of a relatively lower refractive index value disposed in optical contact therewith, and normally such an elongated structure was intended to be used in adjacent parallel relation to or in coiled relation about a high intensity flash tube pumping light source or the like.

Also, it is known that a light signal at the emission wavelength of the laser material directed into an end of such a fiber-like laser amplifier structure for the amplification thereof during the optical pumping of the structure may be provided additional amounts of amplification, or optical gain, when the optically finished flat exit end surface thereof (or even both end surfaces thereof) is suitably bevelled in such a manner as to prevent any part of this light travelling within the core from being internally reflected at said end surface in such a way as to tend to travel back down the core and reduce said gain.

It has now been found that by following the teachings of the present invention, an improved fiber optical laser amplifier structure providing a predetermined amount of gain during the operation thereof can be provided. This is possible when careful consideration is given, in accordance with the laser core material and the laser cladding material being employed, as to the size and relative values of the refractive indices of said core and cladding materials, as to the light-transmitting characteristics of said cladding material with respect to the pumping optical energy needed for excitation of the laser material, as well as to the light-absorbing characteristics of this cladding material at the emission wavelength of said laser material, as to the quality of the optical interface provided between said core and cladding, and as to the surface condition, the shape and the angularity of the exit end surface, or even both end surfaces, of the improved fiber optical laser structure.

When the above-related parts and conditions are properly controlled so that they function in the manner intended, a desired control as to the amplification of the optical signal being transmitted through the laser structure can be effected. Thus, when an optical signal is directed at a predetermined angle of incidence into the entrance face of the laser core, during the optical pumping thereof, so as to travel within the laser core at a relatively low or small angle of deviation relative to the longitudinal axis thereof, this signal will experience relatively few internal reflections at the side wall interface between said core and cladding, will experience only a relatively small amount of penetration into said cladding at each reflection thereof and, accordingly, will be only slightly absorbed, while, on the other hand, other light rays travelling within the laser core at larger angles of deviation relative to said longitudinal axis, but still within the critical angle of total internal reflection afforded by said core and cladding of different refractive indices, will experience a greater number of reflections, will penetrate deeper into the cladding at each reflection, and will, accordingly, experience a greater amount of absorption. Of course, the improved laser amplifier structure works best when the core diameter is kept small, say 50 microns or less, so that a relatively large number of reflections will occur per each unit length thereof.

Thus, when the improved laser structure with suitably bevelled end or ends is optically pumped with sufficient amounts of power, laser action (laser oscillation) will occur for the light rays travelling within the core at relatively high angles of deviation to the axis and this oscillation in the higher order modes will provide an upper limit as to the inversion of population which can be maintained. When, at this time, light rays of the optical signal are directed at the proper angle of incidence into the core so as to travel along or nearly along the axis, and thus are propagated in lower order modes, they will experience a material gain. In fact, this gain will be greater than that experienced by the higher angle rays, because the signal rays spend a lesser amount of time in the absorbing cladding, penetrate lesser amounts and experience a lesser number of reflections.

It is, accordingly, an object of the present invention to provide an improved fiber optical laser amplifier structure, or device, comprising a relatively thin, elongated core formed of a laser material, such as a laser glass, having a predetermined refractive index and an optical finish on the side wall portions thereof and a cladding of light-transmitting material of a relatively lower refractive index disposed in surrounding, contacting relation therewith throughout the greater part of the length of said core, and with said cladding material having not only good light-transmitting properties for optical energy within the predetermined wavelength bands needed for pumping the laser core material but also having a predetermined coefficient of light absorption at the emission wavelength of the laser material, said structure being further provided with an optically finished flat end surface, or surfaces, so carefully angularly bevelled and disposed relative to the longitudinal axis thereof as to provide a controlled amplification for the signal passing therethrough.

It is also an object of the invention to provide in such a laser structure a liquid having a lower predetermined refractive index value than that of said laser core and having predetermined selective light-transmitting and light-absorbing properties arranged to serve as the cladding material for the laser structure and providing a control as to the laser light-amplifying properties to be provided optical signals being transmitted from end-to-end therethrough; said liquid being suitably contained in means allowing said liquid to be continuously circulated for cooling purposes or the like.

Other objects and advantages of the invention will become apparent from the detailed description of the following, when taken in conjunction with the accompanying drawing, in which:

FIG. 1 is a longitudinal sectional view showing a part of a thin, elongated laser component embodying the present invention;

FIG. 2 is a modified form of laser structure likewise embodying principles of the present invention;

FIG. 3 is a graph showing curves for values for total internal reflection for materials employed in carrying out the present invention; and FIG. 4 is a sketch showing a portion of the structure of FIG. 1, somewhat enlarged, for use in describing the invention.

Referring to the drawing in detail and in particular to FIG. 1 wherein an enlarged fragmentary sectional view is shown, it will be seen that the numeral 10 indicates generally an improved fiber laser structure comprising a thin, elongated central fiber-like laser element or core 12 which would normally be made of appreciably greater length than the transverse dimension thereof and would have a predetermined refractive index. The smooth outer side wall portions of this element 12 are indicated at 12'. Disposed in surrounding relation to this thin, elongated fiber laser element 12 and in good optical contact therewith is a transparent cladding 16 of relatively lower predetermined refractive index. Thus, this cladding serves not only to protect the core 12 but also to provide an optical interface 14 of good optical quality therebetween as well as a predetermined refractive index difference between said cladding and said fiber laser element. Also, the cladding adds mechanical strength to the laser element. When desired, a second thicker clear cladding (not shown) of slightly lower refractive index than the first cladding may be employed about the first cladding.

A flat end surface portion 17 is shown disposed at 90° to the longitudinal axis 18 of the laser structure at one end thereof while a sloping or bevelled end surface portion 20 is shown at the opposite end thereof, and this latter end surface is disposed at a predetermined controlled angle $\theta$ relative to a transverse plane 22 adjacent said bevelled end. The angularity of the sloping end surface is very carefully computed and controlled with reference to several related factors of the core and cladding as will be more fully explained hereinafter. Furthermore, if desired, both end surfaces could be similarly sloped or bevelled.

Such a thin, elongated fiber laser structure may be formed in known fashion, such as by use of a polished tube of suitable cladding glass of known refractive index and light-transmitting characteristics and into which has been placed a fairly closely fitting polished rod of laser glass, each of appreciable size, after which the assembly so formed is heated at one end and drawn down to a composite fiber of desired smaller cross-sectional size. In fact, this drawing-down procedure may be at times more conveniently done by a series of similar heating and drawing-down operations rather than in one single operation.

A suitable material for forming such a thin, elongated fiber-like laser element or core having the optically finished side wall portions, the predetermined refractive index and the rugged physical and laser characteristics desired would be a barium crown laser glass selected from the group consisting of a neodymium-doped laser glass, an erbium-ytterbium doped laser glass, a neodymium-ytterbium-doped laser glass, and a holmium-doped laser glass, each having known refractive characteristics.

A light-transmitting cladding material which may be used satisfactorily with a neodymium laser glass to form the fiber laser structure of FIG. 1, would be a selectively absorbing glass selected from the group consisting of a samarium-doped crown glass, a dysprosium-doped crown glass or a ferrous oxide-containing crown glass. Each of these latter glasses is quite transparent to pumping optical energy of wavelengths in the blue and blue-green portion of the visible spectrum while providing light absorption of desired predetermined amount at the emission wavelength of this laser material. Such, of course, would provide a refractive index of a controlled lower value than that of the neodymium laser glass being used therewith. Accordingly, such a cladding glass will allow transmission of pumping optical energy when the laser structure is being side-pumped by flash tube or other known high intensity light source means.

As indicated at 26 in FIG. 1, an optical signal may be directed at such a carefully controlled angle of incidence $i$ relative to the entrance face 17 of the laser structure of component as to enter the laser element 12 and travel therein in such a direction as to have a relatively small predetermined angle of deviation $r$ relative to the optical axis of said component. Accordingly, this ray within the component, as indicated at 26', will tend to travel by total internal reflection down the length of the element and at such time will experience a relatively small number of reflections per unit of length of the laser structure at the optical interface 14. One such reflection is indicated at 28 in FIGS. 1 and 4.

At such a reflection 28, it should be noted, the light ray 26' being totally internally reflected, will experience, as suggested by dotted lines in FIG. 4, a small amount of penetration, as an evanescent wave, in the cladding material 16 and since this cladding material is absorptive insofar as light at the laser emission wavelength is concerned, the result is that a small amount of absorption of this energy will occur at each such reflection. It should be noted also that this ray, after being reflected at an angle of reflection $\theta_2$, equal to $\theta_1$, as indicated at 26", will travel so as to be incident upon the sloping exit end surface 20 (see FIG. 1) of the laser element at such an angle as to be refracted in the direction indicated at 26''' as same passes outwardly of the laser structure. However, some internal reflection of light will occur at the point of incidence of this ray at surface 20, as indicated by the arrow 26R. It should be appreciated, however, that the angle of slope $\theta$ of the end surface 20 has been so carefully chosen that this reflected ray 26R will be directed in such a direction as to pass outwardly through the optical interface 14 and into the cladding 16 without experiencing total internal reflection at said interface. The ray 26R may then be absorbed in the cladding or pass on out of the cladding as indicated at 26R'.

Accordingly, this end-reflected portion of the optical signal will not be allowed to leave the end surface 20 in such a direction as to pass back down the laser element by total internal reflection in such a way as to tend to reduce the optical gain or amplification being provided the signal.

On the other hand, if a higher angled ray, such as indicated at 35 in FIG. 1 (such as a spontaneously emitted light ray) tends to travel within the laser element in the directions indicated by the dotted lines 36, it is possible that this ray would experience a number of internal reflections, such as indicated at 36' and 36", before being incident upon the end surface 20. In fact, the direction of this incident ray could very well be such that it will be reflected back upon itself in such a manner as to thereafter be incident upon the end surface 17 and then reflect along the opposite part of a continuous path of oscillation as indicated by dotted lines 37. Thus, an optical resonant cavity structure can be expected to exist for optical energy travelling within the core 12 at some high angle of deviation, and thus in a higher order of mode propagation. However, the light travelling at this higher angle of deviation will experience a greater number of reflections per unit length of the laser structure and will penetrate the cladding a greater amount at each reflection, and thus will be materially reduced in strength.

It will be appreciated from the foregoing description that, while certain light rays travelling within the laser core 12 at relatively low angles of deviation are not able, because of the angle of the end wall or walls of the structure and the refractive index difference which exists at the interface 14, to oscillate within the core, nevertheless, other light rays which tend to travel within the core at higher angles of deviation will tend to go into laser oscillation during optical pumping of the structure through side wall portions thereof. By careful control of the angle of the end surface, or end surfaces, of the structure and proper choice of cladding material with reference to its refractive index and its absorptive characteristics, a material increase in optical signal amplification or gain may be had.

If the bevel at the end, or ends, of the laser structure is too great, no internal reflection of light from these end surfaces will occur, and the desired high controlled gain in optical signal strength will not occur. Accordingly, in order to insure that some light oscillation in certain higher order modes will occur, the bevel angle $\theta$ at the end, or ends, of the laser structure must be less than $$\cos^{-1}\frac{n_2}{n_1}$$

wherein $n_1$ is the refractive index of the laser core material and $n_2$ is the refractive index of the cladding material.

The smaller the bevel angle $\theta$, the greater will be the number of modes which will be permitted to oscillate, all other conditions of the laser structure being kept constant. However, in the present improved construction, a cladding material which is slightly light-absorbing at the laser emission wavelength is used and this cladding also has a lower refractive index than that of the core. Then, when the fiber laser structure is optically pumped, oscillation will occur only in those higher order modes for which the bevelled end or ends provide a feedback of the end reflected light.

The threshold for laser oscillation will be determined by the losses encountered by these reflected higher order modes. One of the losses is the reflection loss at the interface 14 between the core 12 and absorbing cladding 16. This loss increases as the angle of incidence $\theta_1$ at the interface decreases toward the critical angle for total internal reflection. This effect is shown in lower curve 40 in FIG. 3, wherein an absorption coefficient for the cladding material of 0.13 cm.$^{-1}$ (or 13% per centimeter) has been assumed. (A different absorbing cladding with different loss coefficient is indicated by curve 41.) Then, the ordinate is the loss per reflection $(1-\rho^2)$ and the abscissa is plotted in values of $n_1 \cos \theta_1$; wherein $\theta_1$ is the angle of incidence of the ray at the interface and $n_1$ the refractive index of the core material.

Thus, for an angle of incidence of 81°, there will be a loss of about $4.10^{-4}$ per reflection. For an $8\mu$ fiber, there will be $$\frac{1}{d \tan \theta_1} \text{ or } \frac{1}{8 \times 10^{-4} \times 6.3} = 198$$

reflections per centimeter. This means, of course, a loss coefficient of about $198 \times 4 \times 10^{-4} = .08$ cm.$^{-1}$, or 8% per centimeter.

Therefore, if a higher order mode having this angle of incidence value is to oscillate, the inversion in population must be high enough to yield a gain of at least 8% per cm. An additional gain will also be required to overcome the end reflection losses of the cavity. For simplicity for the moment, it will be assumed that the end losses are negligible and that a gain of 8% per cm. will produce oscillation. It should be noted, however, if the pumping level is increased beyond this threshold value, the inversion will not increase beyond that which yields a gross gain of 8% per cm.

Then, if an optical signal is sent through the fiber at a small angle $r$ relative to the axis 18, it will still experience an 8 percent per cm. gross gain, but the loss coefficient will be smaller. For example, at an angle of $\theta_1 = 85°$ the loss per reflection is $7 \times 10^{-5}$. Also, the reflections per cm. are $$\frac{1}{d \tan 85°} \text{ or } \frac{1}{8 \times 10^{-4} \times 11.4} = 110/\text{cm}.$$

Thus, the loss coefficient is $7 \times 10^{-5} \times 110 = .0077$ cm.$^{-1}$ or 0.8% per cm., and the net gain experienced by such a signal will be $8.0 - 0.8 = 7.2\%$ per cm.

An important consideration is that the inversion is controlled, in the sense that any pumping rate equal to or exceeding the threshold level will not produce an increase in inversion; instead, it will produce practically the same inversion.

Another important consideration is that the level of inversion and, therefore, the amount of gain, can be controlled by first choosing an absorbing cladding for the laser structure having a predetermined loss coefficient, say 13% per cm., and then choosing for the laser structure a bevel angle which is such that oscillation can only occur for rays having a certain angle of incidence at the interface 14. This bevel angle is chosen so that the loss per reflection times the number of reflections per cm. equals the loss desired for the oscillation mode.

Mathematically, the loss per cm. due to the absorbing cladding is given by the equation:

$$\alpha_{a.c.} = (1-\rho^2)m \quad (1)$$

wherein $\rho^2$ is the reflection coefficient at the particular angle of incidence $\theta_1$, and $m$ is the number of reflections per cm.

$$m = \frac{1}{d \tan \theta_1} \quad (2)$$

wherein $d$ is the diameter of fiber core.

The oscillation condition is given by the equation:

$$e^{(\beta - \alpha_{a.c.})l} = 1/R \quad (3)$$

wherein $\beta$ is the gross gain per cm., $l$ is the length of the fiber and R is the reflection at the end faces.

Substitution of Eq. 1 into Eq. 3 yields $$\exp[\beta - (1-\rho_0^2)m]l = 1/R \quad (4)$$

or $$\beta = -\frac{1}{l} \log_e R + (1-\rho_0^2)m_0 \quad (5)$$

and wherein $m_0$ is the number of reflections per cm. for the oscillating mode.

A signal ray at a small angle $r$ with respect to the axis (i.e. a large value of $\theta_1$) will experience a loss at each reflection of $(1-\rho_s^2)$, which depends on the angle of incidence $\theta_1$. The loss per cm. for this signal ray then will be $$\alpha_s = (1-\rho_s^2)m_s$$

Therefore, the net gain, $g$, for the signal ray will be $$g = \beta - \alpha_s = -\frac{1}{l} \log_e R + (1-\rho_0^2)m_0 - (1-\rho_s^2)m_s \quad (6)$$

The theoretical procedure for obtaining a certain value of $g$ would be as follows: select the length of laser structure, $l$, to be used, the end reflectance, R, and the angle of incidence at the interface 14 for the signal ray, which determines $(1-\rho_s^2)m_s$. Then, choose the angle of incidence at the interface 14 for the oscillating rays which yield a value of $(1-\rho_0^2)m_0$ to satisfy Equation 6. Then the end of the structure is bevelled so as to cause oscillation at this latter angle of incidence.

In actual practice, the foregoing theoretical procedure is only a guide. This is because for very small fiber laser structures such as are being considered herein, in which several hundred reflections per centimeter are provided, do not strictly obey the laws of geometric optics. Instead, waveguide mode propagation is important and instead of a single angle of incidence being involved, a range of angles of incidence at the interface should be considered. In addition thereto, there are other loss factors which might enter into the consideration.

In practice, a good procedure would be to select a certain length of fiber laser structure, having a cladding of known absorption characteristics and end reflectance. This fiber with normal ends would first be pumped. The threshold pumping power and amplification are measured. One end would then be bevelled at a small angle, say equal to $$\frac{1}{4} \cos^{-1} \frac{n_2}{n_1}$$

Again, the threshold pumping power and amplification would be measured. This procedure would be repeated with larger bevel angles and the amplification vs the bevel angles would be plotted. From such a curve, the bevel angle which yields the desired amplification is determined. The desired bevel angle will normally lie between 0 and $$\cos^{-1} \frac{n_2}{n_1}$$

and with the larger bevel angles giving the higher signal amplifications.

Once the structure reaches oscillation in a higher order mode, the oscillation limits the amount of inversion of population that can be obtained and, therefore, the amplification in the lower order is limited to the value given by the inversion at that time. This condition can occur each time the laser structure is pulsed or would occur during continuous pumping of the laser structure at a sufficiently high pumping energy input. Thus, the structure may be pumped without too much care being exercised as to the exact amount of pumping energy being supplied and still the laser oscillation in the higher modes of propagation will serve to limit the amount of inversion which can be provided in the lower order modes, and this will place a limit upon the amount of gain which will be obtained for the lower order mode being amplified.

In FIG. 2 is shown a modified form of laser amplifier structure embodying the invention. This structure comprises a thin, elongated laser element 42 formed of a laser glass and shaped so as to provide an extended intermediate portion arranged in a helically coiled formation 44 comprising a desired number of similar connected convolutes disposed between an entrance end portion 46a and an exit end portion 46b.

The coiled intermediate portion 44 of this laser element is arranged so that an elongated flash tube 47 may extend therethrough. The major part of this flash tube is shown positioned within the container 50 in which a light-absorbing liquid 52 intended to serve as an absorbing cladding about the laser element is contained. This liquid contains a salt of samarium, dysprosium or ferrous oxide in such an amount as to serve as light-absorbing means for light at the emission wavelength of the laser element 42 and while still having good light transmitting properties for optical energy at the pumping wavelength bands needed for energizing the laser element. Thus, in the case wherein a neodymium laser glass, for example, is employed as the element 42, the liquid would be such as to absorb at 1.06μ wavelength while having good light transmitting properties for energy in the blue to near-infra-red portion of the visible spectrum.

An additional advantage of this arrangement employing a liquid as the absorbing cladding would be that the liquid 52 may also be arranged to serve as a coolant during operation of the laser structure, particularly if same is being pumped either continuously or at a high repetition rate. Pipes 53 and 54 are shown for this purpose. In either case, the optical signal to be amplified would be directed into the entrance end portion 46a of the laser element at such a controlled angle of incidence as to travel substantially axially down the length of the laser element or at a small angle relative thereto. At the same time, the refractive index difference afforded by the laser element and the liquid as the surrounding absorbing cladding therefor would be so controlled, in the manner already described, as to tend to properly absorb optical energy in higher order modes of propagation within the fiber laser, and provide an optical gain for the signal leaving the exit end 46b of the laser structure. This gain, as before, would be due to the greater number of reflections of the energy in the higher order modes and the greater amount of penetration of this light into the absorbing cladding at each reflection, while a materially lesser number of reflections and a lesser amount of penetration for the energy travelling in the lower order modes would occur. The exit end 46b of this element (or even both ends) would, of course, be so bevelled as to provide the controlled amount or gain or amplification of the optical signal desired during pumping of the structure.

Having described my invention, I claim:

1. A laser amplifier component comprising a relatively thin elongated fiber optical laser core having a diameter of less than 50 microns and formed of a transparent material having a predetermined refractive index $n_1$ and including an active laser ingredient therein, a cladding of material of relatively lower predetermined refractive index $n_2$ than that of said laser material disposed in surrounding contacting relation with the side wall portions of said laser core throughout the greater part of the length thereof, the side wall portions of said laser core being smooth so as to provide with said cladding material an optical interface of good reflective properties therebetween, the opposite ends of said laser core having optically finished flat light-reflecting surfaces formed thereon, one of said flat end surfaces being disposed at very nearly right angles relative to the longitudinal axis of said core so as to permit an optical signal at the emission frequency of said laser material to enter said core and travel within said core at a small predetermined angle of deviation relative to the axis thereof and to pass outwardly through the other flat end surface of said core without having any material part of the energy thereof reflect from said other flat end surface in such a manner as to travel back down the laser core by the process of total internal reflection, said other flat end surface being angularly disposed on said laser core at a small bevel angle $\theta$ relative to a transverse plane through said core adjacent thereto of a value less than $$\cos^{-1} \frac{n_2}{n_1}$$

so as to constitute a reflective end wall defining with said first end wall an optical resonant cavity including said laser core therebetween for light rays travelling within said core at a relatively large predetermined angle of deviation relative to the axis of said core and experiencing total internal reflections at said interface, the material forming said cladding having good light-transmitting properties for said pumping optical energy at the pumping wavelength of said laser material and having a predetermined coefficient of absorption for optical energy at the emission wavelength of said laser material, whereby when an optical signal at the laser emission wavelength is directed into said one end of said laser core at such a predetermined angle of incidence as to travel generally longitudinally within said core at a relatively low angle of deviation and with relatively few reflections during optical pumping of said component of an amount sufficient to produce laser action for light rays travelling at relatively large angles of deviation within said core, the exiting signal will be materially amplified and said light rays travelling at said large angles of deviation will be materially absorbed by said cladding.

2. A laser construction as defined in claim 1 wherein the material forming said core is a laser glass selected from the group consisting of neodymium-doped laser glass, a neodymium-ytterbium-doped laser glass erbium-ytterbium-doped laser glass and holmium-doped laser glass, and the material forming said cladding is a glass selected from the group consisting of samarium-containing glass, dysprosium-containing glass and ferrous oxide-containing glass.

3. A laser construction as defined in claim 1 wherein the material forming said core is a laser glass selected from the group consisting of neodymium-doped laser glass, a neodymium-ytterbium-doped laser glass, erbium-ytterbium-doped laser glass and holmium-doped laser glass, and the material forming said cladding is a light-absorbing liquid containing a salt selected from the group consisting of a samarium-containing salt, a dysprosium-containing salt and an iron-containing salt therein.

References Cited

Marcatili et al., "Bell System Technical Journal," July 1964, pp. 1783–1809 (pp. 1783–1785, 1798–1799, and 1808–1809 relied on).

ROY LAKE, *Primary Examiner*.

DARWIN R. HOSTETTER, *Assistant Examiner*.

U.S. Cl. X.R.

330—56; 350—96; 333—83, 81